US010670693B2

(12) United States Patent
Booij

(10) Patent No.: US 10,670,693 B2
(45) Date of Patent: Jun. 2, 2020

(54) POSITION DETERMINATION SYSTEM HAVING A DECONVOLUTION DECODER

(71) Applicant: Sonitor Technologies AS, Oslo (NO)

(72) Inventor: Wilfred Edwin Booij, Oslo (NO)

(73) Assignee: Sonitor Technologies AS, Oslo (NO)

( * ) Notice: Subject to any disclaimer, the term of this patent is extended or adjusted under 35 U.S.C. 154(b) by 317 days.

(21) Appl. No.: 15/858,700

(22) Filed: Dec. 29, 2017

(65) Prior Publication Data

US 2019/0204408 A1    Jul. 4, 2019

(51) Int. Cl.
| | | |
|---|---|---|
| *G01S 5/18* | (2006.01) | |
| *G01S 3/802* | (2006.01) | |
| *G01S 5/30* | (2006.01) | |
| *G01S 11/14* | (2006.01) | |
| *H04B 11/00* | (2006.01) | |
| G01S 3/808 | (2006.01) | |
| G01S 15/89 | (2006.01) | |

(52) U.S. Cl.
CPC .............. *G01S 5/18* (2013.01); *G01S 3/8022* (2013.01); *G01S 5/30* (2013.01); *G01S 11/14* (2013.01); *H04B 11/00* (2013.01); *G01S 3/8086* (2013.01); *G01S 15/8977* (2013.01)

(58) Field of Classification Search
CPC ... G01S 5/18; G01S 11/14; G01S 5/30; G01S 3/8022; G01S 15/8977; G01S 3/8086; H04B 11/00
See application file for complete search history.

(56) References Cited

U.S. PATENT DOCUMENTS

| | | |
|---|---|---|
| 2013/0083631 A1 | 4/2013 | Harrell et al. |
| 2014/0112103 A1 | 4/2014 | Goldman |
| 2019/0204408 A1* | 7/2019 | Booij .................... G01S 3/8022 |
| 2019/0204409 A1* | 7/2019 | Booij ....................... G01S 5/18 |
| 2019/0339386 A1* | 11/2019 | Ding .................... G01S 15/582 |

FOREIGN PATENT DOCUMENTS

WO    WO-2019130242 A1 *    7/2019    ........... G01S 3/8022

OTHER PUBLICATIONS

Notification of Transmittal of the International Search Report and the Written Opinion of the International Searching Authority, or the Declaration, issued in PCT/IB2018/060660, dated Apr. 25, 2019, 17 pages.
Khyam et al., "Mobile ultrasonic transducer positioning," The Journal of Engineering, Accepted on Mar. 22, 2017, 4 pages.

* cited by examiner

*Primary Examiner* — Daniel Pihulic
(74) *Attorney, Agent, or Firm* — Sterne, Kessler, Goldstein & Fox P.L.L.C.

(57) ABSTRACT

The present disclosure relates to an acoustic position determination system that includes a mobile communication device and at least one base transmitter unit. The mobile communication device is configured to transmit and receive acoustic signals. Due to relative movements between the mobile communication device and the base transmitter unit, frequencies of the received signals shift due to Doppler effect. The mobile communication device is configured to compensate Doppler frequency shifts in the received acoustic signals prior to performing a deconvolution decoding process. The mobile communication device is further configured to compensate Doppler frequency shifts and perform deconvolution decoding process on acoustic signals received from multiple signal transmission paths.

20 Claims, 6 Drawing Sheets

POSITION DETERMINATION SYSTEM HAVING A DECONVOLUTION DECODER

FIELD

The present disclosure relates generally to real-time locating systems, and more particularly to determining a location of a mobile device based at least in part on acoustic-contextual data associated with a real-time locating system.

BACKGROUND

A common challenge in modern business is to locate important resources at any given time in a building or campus environment. Such resources include key personnel, critical pieces of equipment, vital records and the like. For example, the personnel, the critical pieces of equipment and the vital records are typically mobile, are often needed in a variety of locations during a typical working day, and are therefore constantly being relocated during the working day. Given that it is unproductive to divert other resources to locate these resources, it is desirable to develop an approach that can locate these important resources at any time in the environment of a building, campus environment and the like.

BRIEF SUMMARY

Embodiments of the present invention relate to an indoor real-time location system for use in an indoor environment that offers accurate position information for moving mobile communication devices. The indoor real-time location system in accordance with the instant disclosure is configured to compensate Doppler effects in the received acoustic signal prior to performing a deconvolution decoding process. Mobile communication devices receive acoustic signals from one or more transmitter stations and a processing unit performs Doppler effect compensation in the frequency domain. The processing unit can be a processor within the mobile communication device or a remote processor that is communicatively coupled to the mobile communication device.

In some embodiments, a library of Doppler matching templates stored in a memory device can each be used to cross-correlate to the received acoustic signals to determine the transmitted signal code and a Doppler shift frequency in the received acoustic signal. The processing unit can shift the received signal by the determined Doppler shift frequency in the direction indicated by the sign of the Doppler shift frequency.

In some embodiments, the processing unit can include a decoder that performs a deconvolution decoding process on the received acoustic signals to determine a response function. The response function is a result of a direct signal transmission path and reflected signal transmission paths between the transmitter station and the mobile communication device. The response function can be represented by series of complex valued Dirac pulses at various delays, phases, and magnitudes. The processing unit can determine a time of arrival of the transmitted signal codes by identifying a maximum peak. The peak may have to exceed a threshold or satisfy suitable criteria before processing continues.

In some embodiments, the processing unit can determine Doppler shift frequencies for all signal transmission paths. The processing unit arranges peaks of multiple signal transmission paths by descending peak magnitude, generates Doppler corrected templates, and apply a delay corresponding to the identified Dirac peak location. An inverse Fast Fourier Transform (IFFT) is applied to the Doppler corrected templates for each signal transmission path and subtracted from the received signal. A Fast Fourier Transform (FFT) is performed on the remaining signal and the result is cross-correlated with the Doppler shift templates to sequentially determine Doppler shift frequency for each signal transmission path.

In some embodiments, the processing unit can determine Doppler shift frequencies for multiple signal transmission paths simultaneously using a non-linear optimization routine. Each signal transmission path between the transmitter station and the mobile communication device can be accurately modelled using various parameters and the received acoustic signal can be fitted with the modelling data using a non-linear curve fit routine.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION

Figure 1:
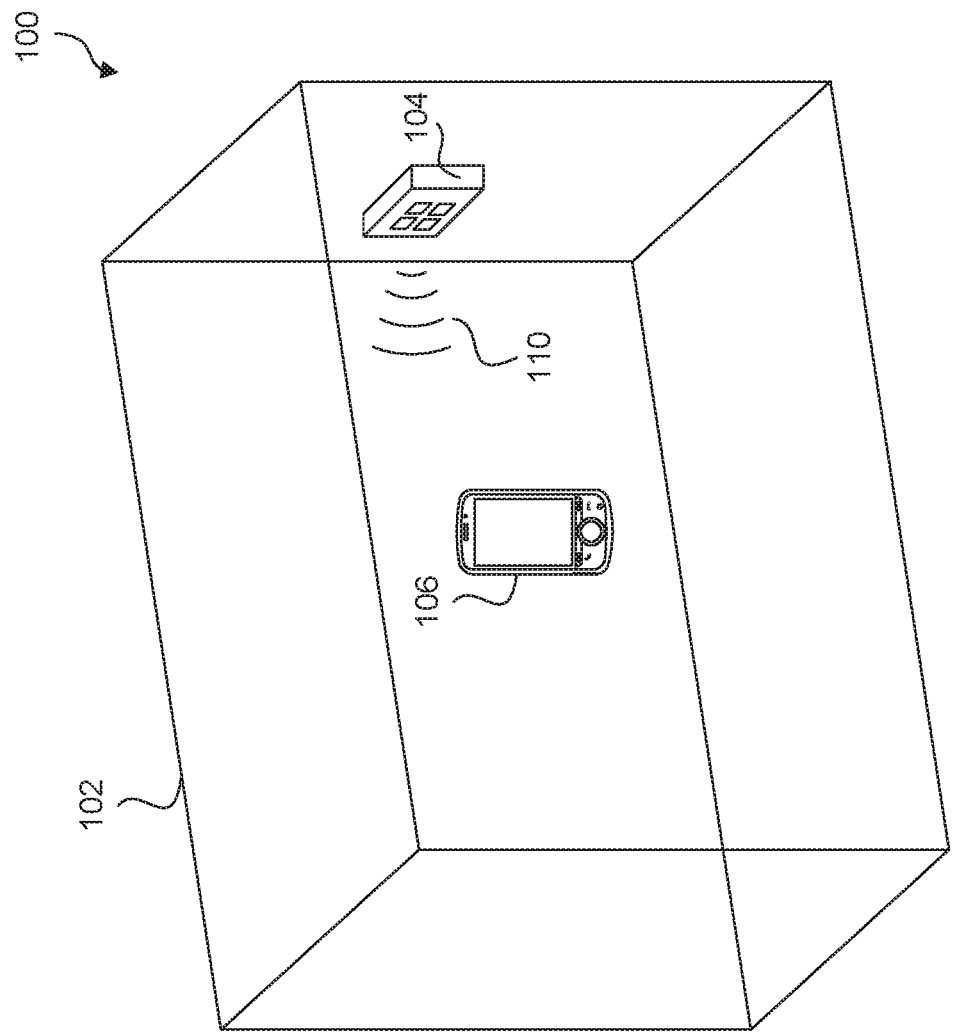
FIG. 1 is a perspective representation of a position determination system, in accordance with some embodiments.

While the present disclosure is made with reference to illustrative embodiments for particular applications, it should be understood that the disclosure is not limited thereto. Those skilled in the art with access to the teachings herein will recognize additional modifications, applications, and embodiments within the scope thereof and additional fields to which the disclosure would apply.

Indoor real-time location systems are used to determine the location of a moveable object, such as a person or an item of equipment, within an indoor environment such as hospitals, offices, or warehouses. Indoor real-time location systems can operate with different levels of accuracy depending on the system infrastructure and provide a three-dimensional position information regarding the person or equipment. An indoor real-time location system can include a network of transmitter stations attached to interior surfaces of the indoor environment and mobile communication devices attached to moveable objects. The mobile communication devices can communicate with one or more of the transmitter stations to determine a three-dimensional position information of the mobile communication device within the indoor environment. Acoustic is well suited to this purpose as it travels slower than radio waves and is generally unnoticeable to humans. Acoustic waves also attenuate more rapidly and are less likely to penetrate walls so signal interferences between rooms can be minimized. Acoustic signals are also easier to process for determining the typical relatively short distances between transmitter stations and the receiver.

However, such an approach has limitations. Mobile communication devices are often attached to objects or persons that move with reference to the transmitter stations. It is challenging to determine a real-time location of a mobile communication device which is moving and thereby creating a Doppler shift in the received signals. In addition, the accuracy in determining the identity and position of the mobile communication device can be adversely affected by multi-path interference, which is commonly present due to reflections of the transmitted signal from walls, ceilings and other surfaces.

Therefore, there remains a need for indoor real-time location systems that provide accurate position information for moving mobile communication devices in an indoor environment. The estimation of the location of a mobile communication device (e.g., mobile communication device) according to example aspects of the present disclosure can provide more accurate and efficient locating techniques relative to conventional real-time locating systems. In particular, the knowledge of an acoustic environment (e.g. acoustic transmitter locations relative to the reflective surfaces) facilitates the location estimation. Such techniques can provide location estimations with an accuracy of between about 2.5 centimeters (1 inch) and about 25 centimeters (10 inches) of standard deviation.

More particularly, upon entry into an environment having a transmitting device, the mobile communication device can receive acoustic signals from the transmitting device. Such received signals can correspond to a signal propagating directly from the transmitting device to the mobile communication device, as well as to one or more signals that have been reflected by a reflective surface within the environment. The location of the mobile communication device can be estimated based at least in part on the received acoustic signals and an acoustic model representing the environment.

In particular, the peaks in the received acoustic signals may be used to determine location of the mobile communication device. For instance, a first set of peaks (e.g. a set of two peaks) can be selected from the received acoustic signals. More particularly, such peaks can be selected from a time domain representation of the magnitude of the received signals. The peaks can be selected based at least in part on an amplitude of each peak and an order of occurrence of the peaks. For instance, the selected peaks can include the first two received peaks having an amplitude greater than a threshold. In this manner, the peaks can be selected based on an assumption that the selected peaks were caused by low order transmitter locations (e.g. the $0^{th}$ order transmitter location and a $1^{st}$ order transmitter location). Each peak of the set of selected peaks can be assigned to a transmitter location based at least in part on the acoustic model. The assignment can be determined based at least in part on an orientation of the mobile communication device with respect to the transmitter locations, and an angular sensitivity of one or more acoustic transducers (e.g. microphones) of the mobile communication device, and/or an angular sensitivity of a transducer of the acoustic transmitting device. The orientation of the mobile communication device can be determined, for instance, using one or more onboard sensors of the mobile communication device. The orientation can be determined with respect to the transmitter locations based at least in part on the known locations of the transmitter locations defined by the acoustic model.

The selected peaks can be selected to correspond to signals associated with a $0^{th}$ order transmitter location and one or more $1^{st}$ order transmitter locations based at least in part on the assumption that the order of arrival of the peaks can correspond to the reflection orders associated with the transmitter locations due to the fact that the acoustic signals associated with higher reflection orders generally travel greater distances that acoustic signals associated with lower reflection orders. In this manner, the peaks can be selected based at least in part on the assumption that a signal (e.g. peak) from a $0^{th}$ order transmitter location will arrive prior to a signal from a $1^{st}$ order transmitter location, which will arrive prior to a signal from a $2^{nd}$ order transmitter location. Similarly, the assignment of the transmitter locations to the peaks can reflect the order of arrival of the peaks. For instance, the first peak can be assigned to the $0^{th}$ order transmitter location, and the second peak can be assigned to a $1^{st}$ order transmitter location. As indicated, in some implementations, the peak assignments can be determined based at least in part on the orientation of the mobile communication device with respect to the transmitter locations, and an angular sensitivity of one or more acoustic transducers (e.g. microphones) of the mobile communication device. In such implementations, the reflection orders associated with the transmitter locations can aid in the transmitter location assignments, and thereby a determination of the location of the mobile communication device, as discussed further below. Although the description to follow operates on acoustic signals, those skilled in the relevant art(s) will recognize that the operations described here can be similarly applied to other type of signals such as, for example, electromagnetic signals, phase shift key signals, orthogonal or semi-orthogonal signals, quadrature amplitude modulated (QAM) signals, any other suitable signals, without departing from the spirit and scope of the present disclosure.

FIG. 1 is a perspective representation of a position determination system 100. Position determination system 100 can be an indoor real-time location systems used to determine the location of a moveable object. Position determination system 100 can include an indoor environment 102, a transmitter station 104, mobile communication device 106, and a remote processing unit 108. These components cooperate to provide a positioning system, capable of estimating a three-dimensional location of the mobile communication device 106 within indoor environment 102. In some embodiments, position determination system 100 can have more than one transmitter stations, installed throughout a building or series of rooms, and more than one mobile communication devices attached to, or incorporated into, people, animals, vehicles, robots, stock, equipment, etc. Indoor environment 102 can be rooms in a building such as, for example, a ward in a hospital, an office in an office building, or a storage space in a warehouse.

Transmitter station 104 can include an acoustic sounder and processing logic for causing the acoustic sounder to transmit acoustic signals 110. In certain embodiments, the acoustic signals 110 are acoustic signals. The acoustic signals 110 transmitted by transmitter station 104 can include a signature unique to the specific transmitter station itself. As described above, position determination system 100 can include more than one transmitter stations, and each transmitter station can be configured to transmit signals containing a signature unique to that specific transmitter station. Each signature is encoded on an acoustic carrier having an acoustic frequency such as, for example, 20 kHz, 40 kHz, ultrasonic or any other suitable acoustic frequencies. The signature can comprise a respective one of a set of sixty-four QPSK-encoded Complementary-Code-Keying (CCK) codes. The signature can be easily extended in units of 2 bits (di-bit) to construe a signature of any desirable length. The signature can be contained in a longer transmission that also has one or more additional elements, such as a preamble and/or data content, preferably also QPSK-encoded on the same acoustic carrier. In some embodiments, each transmitter station can be assigned a unique time slot during which its signal can be transmitted, and the receiver can identify the origin of a received signal based on the receiving time of the signal. Therefore, multiple transmitter stations can be within audible distances from each other transmitting within a certain time frame. In some embodiments, both the signature and time slot methods are used to identify the transmitter stations in the received signal.

Mobile communication device 106 can include a microphone capable of receiving acoustic signals 110 from transmitter station 104 and a processing unit for sampling and processing the received acoustic signals. Mobile communication device 106 is situated within the indoor environment 102, not immediately adjacent either of the walls or the ceiling. It may be attached to a person or item of equipment (not shown). In addition, mobile communication device 106 can be configured to transmit an acoustic signal substantially evenly throughout the indoor environment. Alternatively, it may emit sound with a directional pattern into part of the room. In some embodiments, mobile communication device 106 may include any suitable devices such as, for example, a cell phone, an acoustic transducer, an acoustic tag, and/or any other suitable devices. In some embodiments, mobile communication device 106 may not carry out all the processing using its own processing unit, but may share the processing with a remote computer such as the remote processing server 108 by transmitting relevant data to the remote processing server 108 using acoustic or radio. The mobile communication device 106 and/or transmitter station 104 may comprise a wired or wireless transmitter, such as a radio transmitter, for transmitting information relating to a received or transmitted signal.

Figure 2:
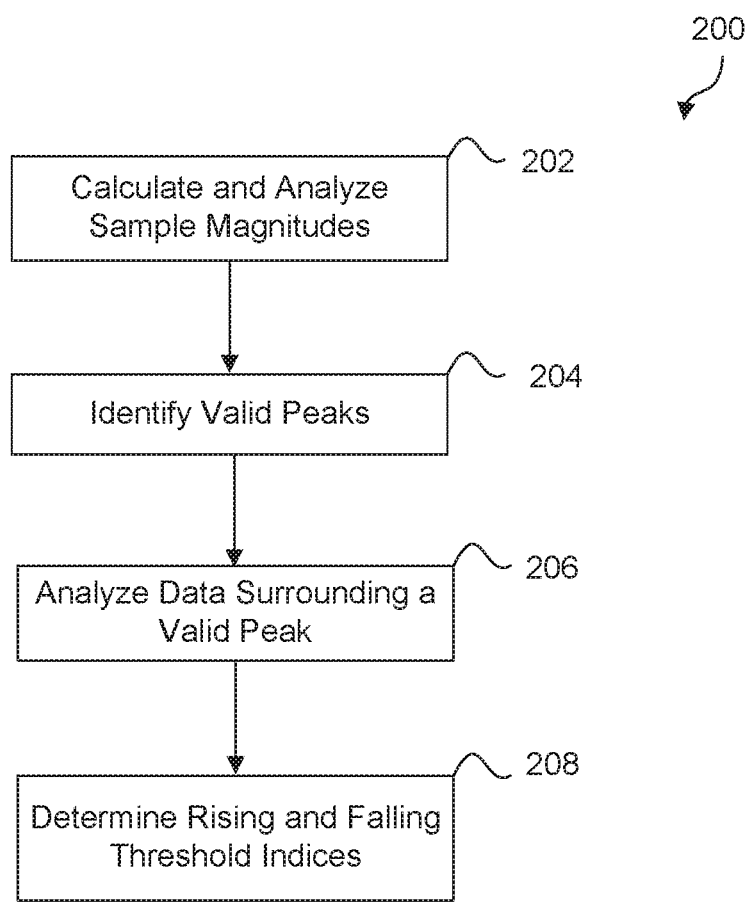
FIG. 2 is a flow chart of a method of performing signal magnitude analysis, in accordance with some embodiments.

FIG. 2 is a flow chart of an exemplary method 200 of performing signal magnitude analysis, in accordance with some embodiments. The method described herein determines signal portions (i.e., signal packets) of the received acoustic signals that may contain signaling content. Other operations in method 200 can be performed and the operations can be performed in a different order and/or vary.

At operation 202, magnitudes of samples are calculated and analyzed. The IQ (complex sampled baseband) data resulting from the mix and decimation process can be oversampled by a factor of 2 to 8, to obtain better time and frequency resolution which is critical in the estimation of Doppler velocity. When no Doppler shift is present, consecutive samples within one chip should have the same modulated phase and therefore should have approximately zero phase difference between them. However, if there is an approximately-constant, non-zero phase derivative across consecutive samples, this is indicative of a phase-shift due to Doppler shift. In some embodiments, the data sampling can be performed at the critical sampling rate (i.e., the chip sample rate equals to the chip rate). Magnitude of each IQ sample is calculated and the average magnitude is calculated over the symbol length for all sampling positions as they become available. The average magnitude is differentiated using a differentiation filter with a length of typically half the symbol length. In some embodiments, Lanczos or finite impulse response (FIR) differentiation filter can be used.

At operation 204, valid peaks are identified. Peaks in the averaged magnitudes are identified by searching for negative going zero crossings of the differentiated magnitude data and requiring that the magnitude value is over a certain threshold value. In some embodiments, the threshold value can be calculated dynamically based on a statistical analysis of the incoming IQ or magnitude data. For example, the threshold value can be a running average of the lowest 10 percentile of magnitudes. In some embodiments, the data can be delayed by a known amount of samples due to the filter length. For example, the delay can be n number of samples for a Lanczos filter with filter length 2n+1.

At operation 206, data surrounding a valid peak is analyzed. IQ data surrounding a valid peak can be sent to a multipath symbol sample window extractor algorithm for further analysis. In some embodiments, the surrounding data can be 128 samples. The multipath symbol sample window extractor is critical in a deconvolution approach since signal portions that contain incomplete symbols severely compromise the deconvolution result. It is the task of the extractor algorithm to the extract signal portions that contain the overlapping multipath symbol copies for a single symbol.

At operation 208, rising and falling threshold indices are determined by the multipath symbol extractor. The rising threshold index is determined at value less than half the peak magnitude value. In some embodiments, the rising threshold index is determined at about 0.35 of the peak magnitude value. In addition, the start of the first path can be extrapolated by subtracting the result of rising threshold multiplied by the symbol length from the rising threshold index.

Similarly, the falling threshold index can be determined at 0.1 or less of the peak magnitude value. Signal transmission paths that are delayed in time typically have much lower magnitudes due to the spreading and absorption of the acoustic signal. The end of the symbol's final path can be determined by first subtracting the falling threshold from 1 and multiplying the result with the symbol length, and then subtracting the result of the first step from the falling threshold index. The magnitude section between the start and stop indices can be further analyzed for the occurrences of magnitude valleys (i.e., minima). Minima can be identified by searching for positive slope zero crossing in the differentiated magnitude signal. Local minima which extend greater than a chip can indicate that the signal transmission paths are not in full overlap and that the signal can be analyzed as two non-overlapping occurrences.

If no minima are found on either side of the valid peak, the final start and stop indices for the symbol sample window can still be determined. For example, the zero magnitude crossings of the average magnitude at start and stop positions can be found by linear extrapolation at the threshold locations using the differentiation magnitude value as slope. If a minimum is found to the left of the peak (in the rising portion of the averaged magnitude signal), the start of the symbol sample window is adjusted to exclude the previous non-overlapping symbol occurrence. Since there can be another path interfering with the averaged magnitude signal, differentiated magnitude signal can no longer be used to estimate the start of the signal, instead the start of window can be determined by first multiplying the symbol length with the average magnitude and divide by the peak value, and then subtract the result in the first step from the minimum index. Similarly, the stop index of the window can be modified if a minimum is found to the right of the peak. For example, the stop index can be determined by a first step of dividing the average magnitude by the peak value and subtracting the result from 1. The result from the first step is multiplied with the symbol length and then subtracted from the minimum index value.

Figure 3:
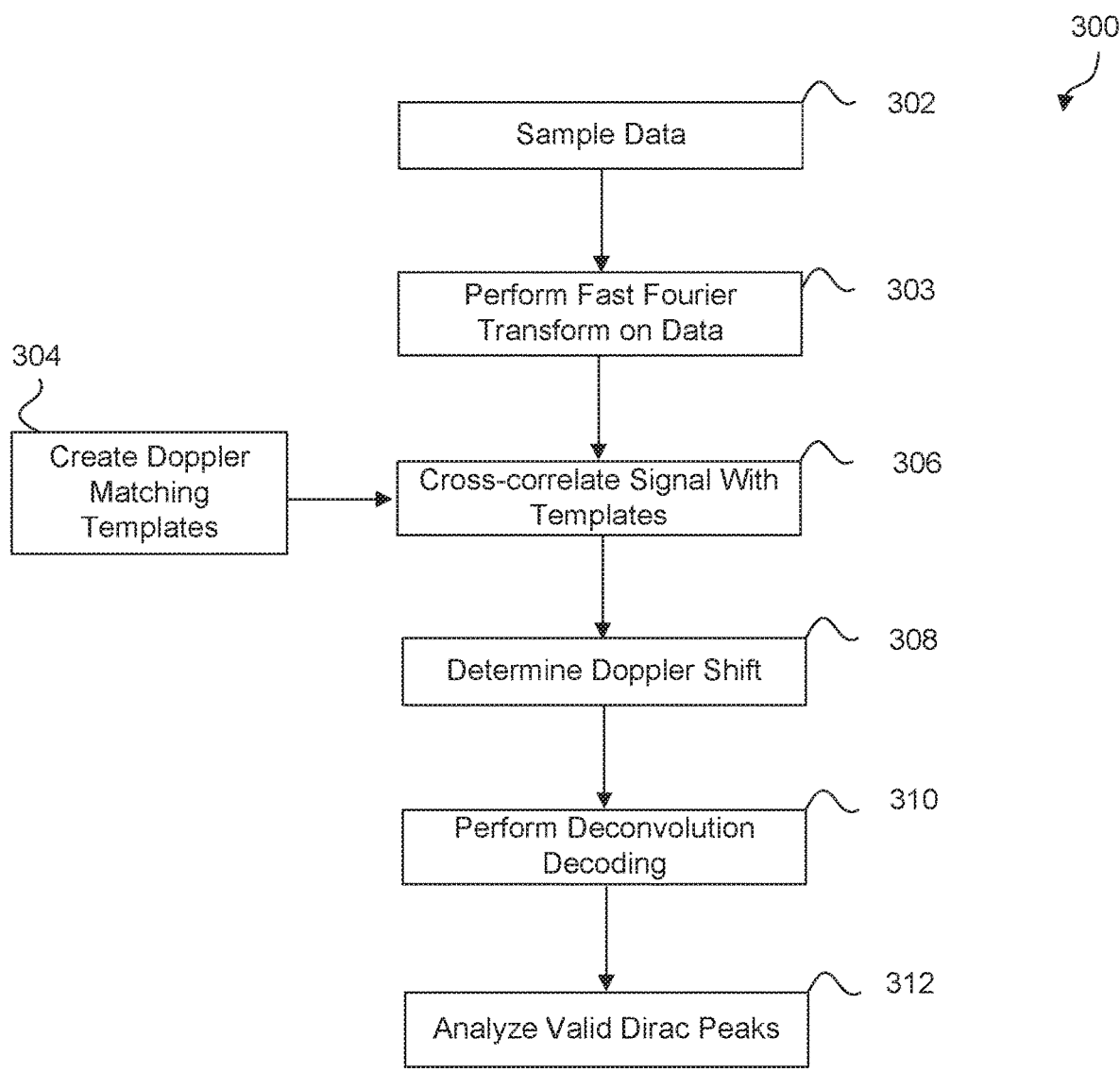
FIG. 3 is a flow chart of a method of determining position information of a mobile communication device, in accordance with some embodiments.

FIG. 3 illustrates operations of an exemplary method 300 for determining position information of a mobile communication device, in accordance with some embodiments. Other operations in exemplary method 300 can be performed and the operations can be performed in a different order and/or vary. As described above, the determination processes can be performed in a processing unit embedded in mobile communication device 106 or performed in a remote processing unit that is communicatively coupled to mobile communication device 106.

At operation 302, mobile communication device 106 receives and samples the acoustic signals transmitted from transmitter station 104. The received acoustic signal 110 is first down-converted to baseband, then sampled at or higher than the chip rate. In some embodiments, the received acoustic signal 110 can be oversampled by a factor between 2 to 8 to obtain better time and frequency resolution. In some embodiments, the data sampling can be performed at the critical sampling rate (i.e., the chip sample rate equals to the chip rate).

Mobile communication device 106 can use an energy detection window that has a length of thirty-two samples to identify a sequence of samples that can contain CCK codes. Each CCK code can consist eight complex chips with each complex chip being encoded as one of four possible QPSK symbols. CCK codes are known from spread-spectrum radio communication systems. When used in a coherent radio system, additional two bits of information can be encoded in the quadrature phase of each CCK code chip, enabling eight bits ($d_7 \ldots d_0$) of data to be encoded by each code (i.e., 256 different chipping sequences), where $d_0$ is the least significant bit and the first in time.

At operation 303, Fast Fourier Transform (FFT) is performed on the sampled data, in accordance with some embodiments. An FFT is performed on the 256 samples of the received signal, resulting in 128 bins with a frequency resolution of 7.81 Hz/bin, covering a frequency range of 1 kHz. The FFT parameters are selected so as to measure Doppler shift of up to 1 kHz. This can be sufficient if the signal is transmitted on a 41 kHz carrier and if the mobile communication device 106 is carried by a person in an indoor environment. However, other embodiments can, of course, use different FFT parameters.

At operation 304, Doppler matching templates are created, in accordance with some embodiments. Doppler matching templates are used to cross-correlate with the Doppler search templates of the received acoustic signals to determine the transmitted signal code and a Doppler shift frequency in the received acoustic signal. In some embodiments, the Doppler matching templates can be a signature template stored in a memory device. In some embodiments, other signature templates can be used such as, for example, one or more phase key signals. Cross-correlating received signal with generated Doppler matching templates can remove system response behavior that is not associated with the received signal. For example, the cross-correlation process can remove system effects introduced by the driver and transducer in the transmitter or in the signal transmission pathway due to the microphone and any subsequent audio filtering. Accounting for such effects in the detected transmitted signal code prevents degradation of the decoding process and therefore the ability to determine the position information of mobile communication device 106. Such system effects can be accounted for by characterizing each individual system response function and compensating the transmitted signal code. In some embodiments, received acoustic signals can be measured in an anechoic room and the resulting signals can be used as Doppler matching templates with each template ID representing a transmitted signal code. In some embodiments where conventional CCK codes are used, 64 codes can be generated and therefore 64 templates are generated. In some embodiments, other numbers of templates can be generated depending of the type of transmitted signal codes used.

The combined system response of transmitter station 104 and circuitry in mobile communication device 106 can be accounted for by measuring a plurality of acoustic signals in a mobile communication device 106 in an anechoic chamber. Transmitter 104 is excited sequentially using all available codes in a code sequence. In some embodiments where conventional CCK codes are used, 64 codes can be generated. The received acoustic signal is subsequently sampled at or higher than the chip rate. In some embodiments, the received acoustic signals are sampled at 4 times the chip rate. Once a code is identified the 32 complex samples including two buffer samples at either end (36 complex samples), were extracted and stored as template signals. The accurate location of the CCK code within these 36 samples can be found using a direct correlation decoding method and stored in the template. In some embodiments, the Doppler search templates can be further processed to ease processing by using a complex valued FFT routine with zeros being added to the complex time samples. For example 220 zeros can be added to the 36 complex samples to provide a total of 256 samples. This improves the frequency resolution achievable for the Doppler shift frequency estimate. Alternatively the complex valued frequency response of the transmitter and receiver signal chains can be characterized individually and stored for retrieval by the mobile device. These transfer functions can subsequently be used by the mobile device in the deconvolution step to remove the distortion introduced by these components in the received microphone signal. Such processing is advantageously done in the frequency domain.

At operation 306, the magnitude of the received acoustic signal is cross-correlated with the magnitude of the Doppler matching templates in the frequency domain, in accordance with some embodiments. Each code value in the Doppler matching template is evaluated as a candidate for the transmitted code signal of the received acoustic signal. In some embodiments, a plurality of Doppler search templates are generated using the received signal and cross-correlated with the Doppler matching template to determine a Doppler shift for each Doppler search template. For example, after FFT is performed on the 256 samples of the received signal, 128 bins are generated with a frequency resolution of 7.81 Hz/bin, covering a frequency range of 1 kHz. Each bin of the received signal can be a Doppler search template. As described above, FFT has been performed on the received acoustic signal prior to the cross-correlation process and the FFT parameters are selected so as to measure Doppler shift frequency of up to about 1 kHz. In some embodiments, the FFT parameters can be selected for the measurement of a higher or lower Doppler shift frequency. Therefore, the cross-correlation process is performed only over the indices that are within a pre-defined maximum Doppler velocity.

At operation 308, the Doppler shift frequency in the received acoustic signal is determined, in accordance with some embodiments. The aim of the cross-correlation process is to determine Doppler shift frequency for each Doppler search template using one of the 64 CCK codes, where the estimated occurrence of Doppler shift is the frequency shift that produces the largest cross-correlation peak. Each Doppler matching template is cross-correlated with a Doppler search template of the received acoustic signal and the cross-correlation process is repeated for each of the s64 templates until the maximum correlation peak is identified. The identified Doppler shift frequency template is then used to identify the transmitted CCK code and to estimate the Doppler-shift value. The largest correlation peak may have to exceed a threshold, or satisfy some other plausibility criteria, before processing continues. The Doppler shift can be determined with a resolution smaller than the frequency bin size using peak shape analysis. For example, the peak can be fitted to a parabolic curve to determine a maximum of the parabola. Certain criteria can be used to determine whether incoming data contains one or more CCK codes rather than high bandwidth noise impulses. In some embodiments, cross correlation value normalized by the peak value of the magnitude of the IQ signal divided by the symbol length is between 0.6 and 1.5. In some embodiments, the peak width of the frequency magnitude correlation can be of the order of one-tenth of the chip rate. Sub-sampling can provide the benefit of reducing power consumption, especially for mobile device.

After a Doppler shift frequency is determined for each Doppler search template in the received acoustic signal, the processing unit can shift all samples of the received acoustic signal by the determined Doppler shift frequency in the direction indicated by the sign of the Doppler shift frequency. As a result, the Doppler shift frequency in the received acoustic signals has been compensated and the shifting process generates compensated acoustic signals. In some embodiments, the Doppler shift can be applied to the templates rather than the measured signal. For example, the templates can be shifted by the determined Doppler shift frequency in the direction indicated by the sign of the Doppler shift frequency. Therefore, using either approach, the samples of the received acoustic signal and the Doppler search templates are shifted relative to each other.

At operation 310, a deconvolution decoding process is performed on each Doppler search template of the compensated acoustic signals, in accordance with some embodiments. Deconvolution decoding process is an algorithm-based process used to reverse the effects of convolution on recorded data. The objective of the deconvolution decoding process herein is to determine the solution of a convolution equation of the form f*g=h, where h is the compensated acoustic signals, g is the transmitted signal code, and f is a response function resulting from a direct signal transmission path and reflected signal transmission paths. The response function f can be represented by a series of complex valued Dirac pulses at various delays, phases and magnitudes. As shown above, the response function f can be determined by the complex division of F=H/G, with the capitalization signifying the respective Fourier transformed representations of f, g, h. However, for some transmitted signal code values, nodes exist at the chirp frequency that can result in a division by zero. This issue can be solved by comparing the magnitude of the transmitted signal code value with a predetermined threshold value, such as, for example, 0.5. If the magnitude of the transmitted signal code value exceeds the threshold value then the operation proceeds to perform the complex division to determine the response function. If the magnitude is below the threshold value then the operation proceeds to set the transmitted signal code value to zero.

As described above, the transmitted signal code g can be padded with zeros up to a length of 256 samples. As a result, the length of compensated acoustic signal h also has a length of 256 samples. Typically, peaks are resolved in a duration corresponding to the original length of the response function f This length is variable and is restricted to be identical to the length of compensated acoustic signal h with one extension. Response function f is circularly continuous over its length, i.e., the end samples can be added to the start to be able to resolve paths which occur close to the origin. In some embodiments, this was done for the final four samples.

At operation 312, valid Dirac peaks are identified in the response function, in accordance with some embodiments. One of the largest challenges in the implementation of a deconvolution decoder is to identify valid Dirac peaks from other peaks that occur due to noise in the response signal f as well as known processing imperfections in FFT based operations. The determination of valid Dirac peaks in response functions can be further explained with reference to FIGS. 4 and 5 below.

Figure 4:
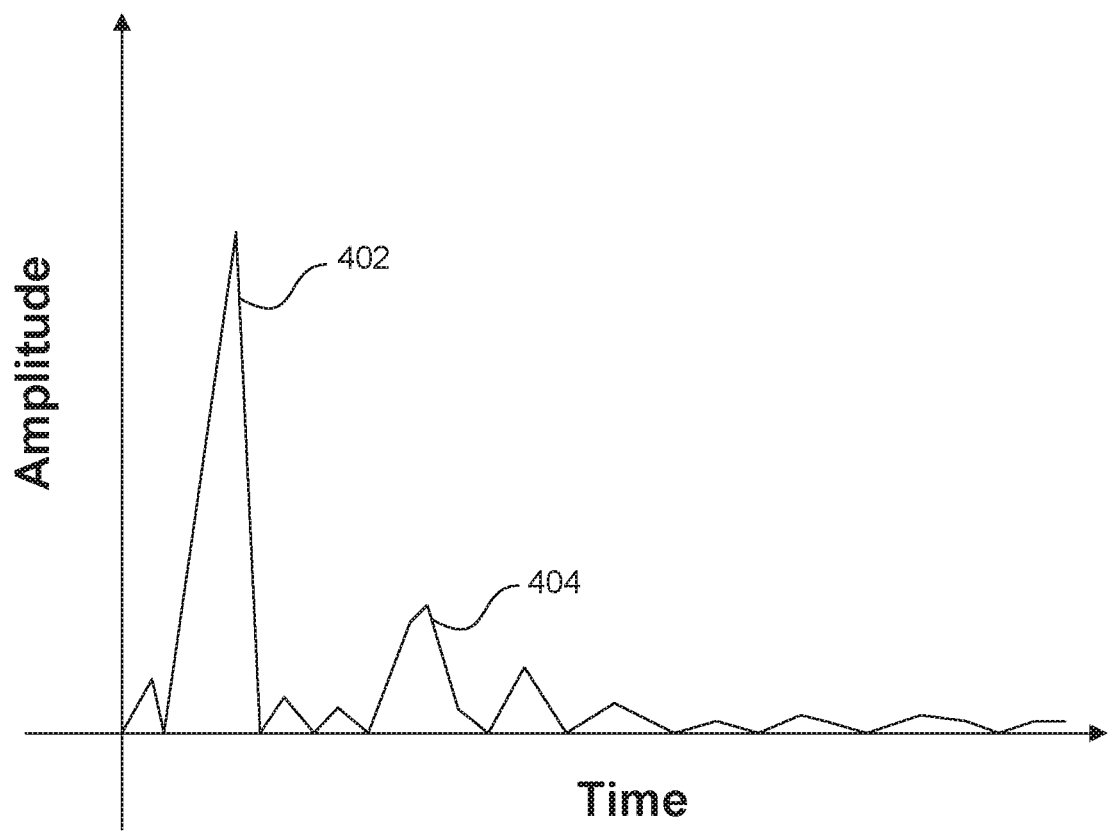
FIG. 4 is a schematic representation of the response function for deconvolution with a transmitted signal code, in accordance with some embodiments.

FIG. 4 is a schematic representation of the response function for deconvolution with the transmitted signal code, in accordance with some embodiments. The response function illustrated in FIG. 4 includes two valid path peaks: first valid peak 402 and second valid peak 404. Subpeaks are peaks illustrated in FIG. 4 that are not the two valid path peaks described above. Subpeaks have magnitudes that can be substantially similar to the second valid peak 404. Therefore, a method is needed to extract valid paths from the response function f.

Figure 5:
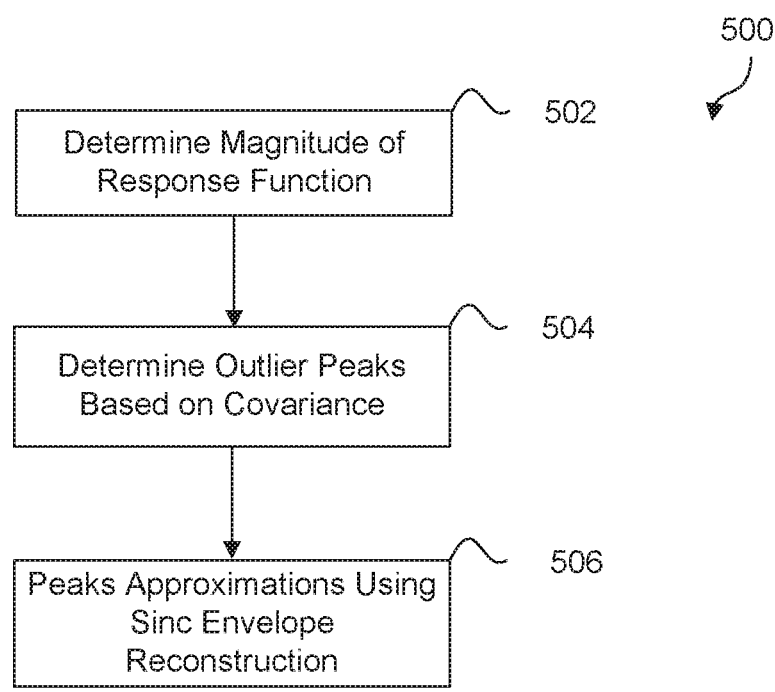
FIG. 5 is a flow chart of a method of performing peak analysis in the received acoustic signals, in accordance with some embodiments.

FIG. 5 is a flow chart illustrating operations of an exemplary method 500 for extracting valid paths from a response function, in accordance with some embodiments. Other operations in exemplary method 500 can be performed and the operations can be performed in a different order and/or vary.

At operation 502, magnitude of the complex valued response function is calculated, and the magnitude data is scaled with a power law function that compensates partly for the effect of spatial spreading. The index and magnitude data is then arranged in a descending power scale magnitude.

At operation 504, a statistical distribution analysis is performed on the scaled magnitude data to identify outlier peaks based on covariance. The analysis is performed in iterations until the scaled covariance difference is below a threshold value or all the samples are analyzed. For the remaining set of scaled magnitude data, the covariance is calculated and stored in a shift register. The difference of the new covariance between the covariance from the previous iteration is calculated and scaled the result with the covariance of the original data set, and the largest scaled magnitude in the remaining data set is then removed.

The identified outlier peaks can then be clustered to their corresponding valid peaks. The clustering process is performed based on the index of the outlier peaks, and if the outlier peak is separated from the Dirac peak by only one index position they can belong to the corresponding Dirac peak. In some embodiments, further magnitude calculations can be done on the original magnitude data without applying the power law function. In some embodiments, it is advantageous to perform the above analysis using the RMS operation rather than covariance operation. The RMS operation is sensitive to a DC offset shift, which arises when deconvolution is performed using non-matching code templates.

At operation 506, peak approximation is performed using sinc envelope reconstruction. Peak magnitude values depend on the distribution of samples in relation to the path position. To correct this sampling issue, the path peaks are reconstructed using the sinc function as an approximation of the Dirac pulse. The corrected magnitudes and locations are then used in further calculations. The qualified peak magnitude can be calculated using the root mean square (RMS) noise over the whole sample set minus the peak samples. A local RMS noise can also be determined by calculating the RMS noise over a subset of samples surrounding the peak noise and minus the peak samples. In some embodiments, the subset of samples can be samples included in a window with sample length equal to the code length. The maximum signal to noise ratio can then be determined by dividing the largest envelope corrected peak magnitude by the RMS noise of the whole sample set. The peak signal to noise ratio is determined by dividing the peak magnitude by the local RMS noise, and for each peak the phase of the peak is also determined. Each Doppler search template is cycled through the code templates of the Doppler matching templates, and the combination that generates the highest signal to noise ratio is determined to be the winning code that was actually transmitted by the transmitter. Subpeaks that exceed a threshold value of peak magnitude over local noise can also qualify for the winning code.

In some embodiments, the processing unit can determine Doppler shift frequencies for all signal transmission paths. The Doppler shift frequency determined in the description above represents the average Doppler value of all signal transmission paths. Typically one signal transmission path dominates the magnitude spectrum and therefore also dominates the average Doppler shift frequency. This Doppler value can be a good estimate for the Doppler velocity of the signal transmission path with the highest peak magnitude. To find the Doppler velocities of other paths, the processing unit arranges multiple signal transmission paths by descending peak magnitude. Doppler corrected templates can be generated and a delay is applied to the corresponding identified Dirac peak location. An inverse Fast Fourier Transform (IFFT) can be applied to the Doppler corrected templates for each signal transmission path and subtracted from the received signal. A Fast Fourier Transform (FFT) is performed on the remaining signal and the result is cross-correlated with the Doppler shift templates to determine Doppler shift frequency for each signal transmission path. The determined Doppler velocity can be stored for the next iteration.

In some embodiments, the processing unit can determine Doppler shift frequencies for multiple signal transmission paths simultaneously using a non-linear optimization routine. The non-linear optimization routine can be used in complex acoustic reflection cases. Each signal transmission path between the transmitter station and the mobile communication device can be accurately modelled using various parameters and the received acoustic signal can be fitted with the modelling data using a non-linear curve fit routine. The modelling parameters can include a time delay as determined during the peak analysis of the deconvolution signal. The modelling parameter can also include a magnitude derived from the peak analysis of the deconvolution signal or resolved as a parameter in the non-linear optimization. The modelling parameter can further include an observable arising from the remaining wavelength fraction of the path distance between the transmitter unit and the mobile communication device. The modelling parameter can further include a frequency index shift arising from relative motion between the transmitter unit and the mobile communication device. The measured data is then fitted with the modelled data using a non-linear curve fit routine. In some embodiments, the non-linear curve fit routine can implement the Levenberg Maquadt method.

The curve fitting procedure can include independent variable series X, dependent variable series Y, and a model objective function that calculates the modelled Y values. The modelled Y values are set to a real valued array with a length equal to the incoming IQ data length and with all values set to zero. The model objective function is configured to calculate the magnitude difference between measured and model IQ data at each sample index. The measured IQ data is then converted to a real array by interleaving the IQ data, resulting in an X array that is twice the length of the IQ signal length. In the objective function the X array is unpacked and re-arranged as complex valued data. Detailed operations of the non-linear fitting method can be further explained below with reference to FIG. 6.

Figure 6:
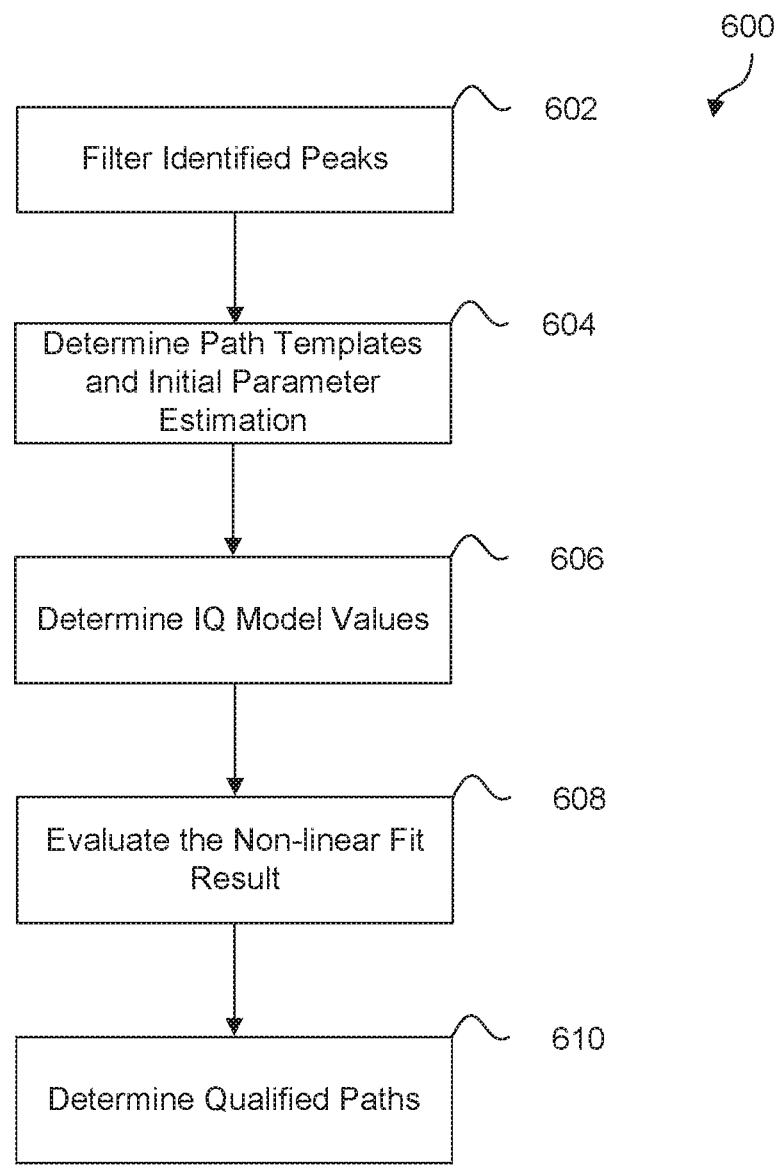
FIG. 6 is a flow chart of a method of determining Doppler velocities for all signal transmission paths using non-linear fitting model, in accordance with some embodiments.

FIG. 6 is a flow chart of an exemplary method 600 of determining Doppler velocities for all signal transmission paths using a non-linear fitting model, in accordance with some embodiments. Other operations in exemplary method 600 can be performed and the operations can be performed in a different order and/or vary.

At operation 602, peaks identified from the deconvolution signal are filtered. The filtering process can be performed based on threshold values for signal to noise ratios and magnitudes. For example, signal magnitudes are required to be greater than a certain fraction of the RMS amplitude of the IQ signal, and only peaks meeting or exceeding these criteria are used in the subsequent steps.

At operation 604, path template and initial parameter estimation are determined for all qualifying paths. The path template is determined for the ID identified that is shifted by the delay found from the deconvolution peak location. After the time delay is applied, an inverse FFT can be applied to obtain the time shifted template in the time domain, ready for use in the model fit. Initial parameter estimations are also determined for qualifying paths. The initial parameter estimations can include magnitude information determined from the deconvolution peak value and reconstructed using a sinc envelope function. In some embodiments, the magnitude information can also be a fixed parameter. The initial parameter estimations can also include phase determined from the deconvolution peak value. The initial parameter estimations can further include an average Doppler frequency index shift determined from the frequency correlation with an added random value to seed the fit routine.

At operation 606, IQ model values are determined by adding all modelled paths. The Doppler induced phase velocity for a path shift is applied to each path in a similar way as the time delay. In some embodiments, the complex IQ values of the path template can be multiplied by a factor that is determined by the number of samples in the template and the length of the FFT. The non-linear fit routine can be set to terminate either when a maximum number of function call is exceeded or when changes to the fitting parameters have converged and are less than a specified tolerance. In some embodiments, the tolerance threshold can be $1e^{-5}$.

At operation 608, the non-linear fit result is evaluated by calculating a residue value that is the magnitude of the difference between measured and modelled IQ data at each sample index. In some embodiments, all fitting parameters are evaluated for errors using standard deviations.

At operation 610, qualified paths are determined based on threshold values or suitable criteria. Only qualifying paths are returned as valid decoder results. The suitable criteria can include that path magnitude divided by the mean residue is required to exceed a threshold fraction. In some embodiments, the threshold fraction can be about 0.75. The suitable criteria can also include that the standard deviation of the path phase is required to be less than a threshold value. In some embodiments, the threshold value can be about 2 radians. The suitable criteria can further include that the Doppler index shift of the path is less than a threshold value such as, for example, 20 indices. The suitable criteria can further include that the Doppler index standard deviation is less than a threshold value such as, for example, 3.

In some embodiments, an alternative non-linear fit method for acoustic modelling can be implemented. The alternative non-linear fit method implements a complete and accurate acoustic model as the objective function to fit the IQ measured data. The fitting parameters can include (i) the position of the mobile communication device; (i) velocity vector of the mobile communication device; (iii) random phases for each path used in the acoustic model; (iv) suitable parameters specified to account for blockage of the mobile communication device; and (v) any other suitable parameters. In particular, the parameters used to account for blockage of the mobile communication device can include (i) parameters that model the loss of visibility of a reflective structure that causes complete or partial loss of all associated paths; and (ii) parameters that model attenuation caused by the mobile communication device being enclosed in objects such as bags or pockets.

It is to be appreciated that the Detailed Description section, and not the Abstract of the Disclosure, is intended to be used to interpret the claims. The Abstract of the Disclosure section may set forth one or more but not all exemplary embodiments contemplated and thus, are not intended to be limiting to the subjoined claims.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A mobile communication device, comprising:
   a receiver configured to receive one or more acoustic signals from a transmitting device;
   a memory unit configured to store a plurality of signature templates; and
   a processing unit configured to sample the one or more acoustic signals to generate sampled acoustic signals, wherein the processing unit is further configured to:
      cross-correlate the sampled acoustic signals with at least one of the plurality of signature templates in frequency domain to determine a Doppler shift frequency of the sampled acoustic signals;
      shift the sampled acoustic signals or shift the plurality of signature templates in the frequency domain by the Doppler shift frequency;
      de-convolve the shifted sampled acoustic signals to generate a response function;
      perform a peak analysis on the response function to identify valid peaks and identify one or more signature templates transmitted from the plurality of signature templates using the identified valid peaks; and
      determine a location of the mobile communication device based on the identified valid peaks.

2. The mobile communication device of claim 1, wherein each of the plurality of signature templates comprises a plurality of phase shift keyed signals.

3. The mobile communication device of claim 1, wherein to cross-correlate, the processing unit is cofigured to determine the Doppler shift frequency with sub-sample resolution frequency using a peak fit algorithm.

4. The mobile communication device of claim 1, wherein the processing unit is further configured to determine an identity of the transmitting device using the identified valid peaks.

5. The mobile communication device of claim 1, wherein the processing unit is further configured to shift the sampled acoustic signals in frequency by a value of the Doppler shift frequency.

6. The mobile communication device of claim 1, wherein the processing unit is further configured to calculate the response function using an Inverse Fast Fourier Transform (IFFT) prior to performing the peak analysis.

7. The mobile communication device of claim 1, wherein the processing unit is further configured to determine the Doppler shift frequency by finding a maximum magnitude correlation between the signature templates and the sampled acoustic signals.

8. The mobile communication device of claim 1, wherein the processing unit is further configured to:
   scale the response function with a power law function;
   perform a statistical distribution analysis;
   remove outlier peaks; and
   perform peak approximations using an envelope reconstruction function.

9. The mobile communication device of claim 1, wherein the processing unit is further configured to determine the Doppler shift frequency with sub-sample resolution using a peak fit algorithm.

10. The mobile communication device of claim 1, wherein the processing unit is further configured to determine the valid peaks using respective signal-to-noise ratios.

11. A computer-implemented method of determining an identity of a transmitting device by a mobile receiving device, the computer-implemented method comprising:
   receiving, by the mobile receiving device, one or more acoustic signals from the transmitting device;
   sampling the one or more acoustic signals to generate sampled acoustic signals;

performing Fast Fourier Transform (FFT) on the sampled acoustic signals to generate FFT sampled acoustic signals;

cross-correlating the FFT sampled acoustic signals with signature templates in a frequency domain to determine a Doppler shift frequency of the FFT sampled acoustic signals;

shifting the FFT sampled acoustic signals or shifting the plurality of signature templates in the frequency domain by the determined Doppler shift frequency;

de-convolving the shifted FFT sampled acoustic signals to generate a response function;

performing a peak analysis on the response function to identify valid peaks of the response function, and identifying one or more signature templates transmitted from the plurality of signature templates using the identified valid peaks; and determining a location of the mobile receiving device based on the identified valid peaks.

12. The computer-implemented method of claim 11, wherein each of the signature templates comprises a plurality of phase shift keyed signals.

13. The computer-implemented method of claim 11, wherein the cross-correlating further comprises determining the Doppler shift frequency with sub-sample resolution frequency using a peak fit algorithm.

14. The computer-implemented method of claim 11, further comprising determining the identity of the transmitting device using the identified valid peaks.

15. The computer-implemented method of claim 11, wherein the FFT sampled acoustic signals are shifted in frequency by a value of the determined Doppler shift frequency.

16. The computer-implemented method of claim 11, further comprising calculating the response function using an Inverse Fast Fourier Transform (IFFT) prior to performing the peak analysis.

17. The computer-implemented method of claim 11, wherein the Doppler shift frequency is determined by finding a frequency of the signature templates with a maximum magnitude correlation to the FFT sampled acoustic signals.

18. The computer-implemented method of claim 11, wherein performing the peak analysis comprises:
   scaling the response function with a power law function;
   performing a statistical distribution analysis;
   removing outlier peaks; and
   performing peak approximations using an envelope reconstruction function.

19. The computer-implemented method of claim 11, wherein the cross-correlating further comprises determining the Doppler shift with sub-sample resolution frequency using a peak fit algorithm.

20. The computer-implemented method of claim 11, further comprising determining the valid peaks using respective signal-to-noise ratios.

* * * * *

UNITED STATES PATENT AND TRADEMARK OFFICE
CERTIFICATE OF CORRECTION

PATENT NO. : 10,670,693 B2
APPLICATION NO. : 15/858700
DATED : June 2, 2020
INVENTOR(S) : Wilfred Edwin Booij It is certified that error appears in the above-identified patent and that said Letters Patent is hereby corrected as shown below:

In the Claims

In Column 14, Claim 3, Line 26, delete "cofigured" and insert --configured--.

Signed and Sealed this
Twenty-first Day of November, 2023

Katherine Kelly Vidal
*Director of the United States Patent and Trademark Office*